United States Patent Office 2,757,983
Patented Aug. 7, 1956

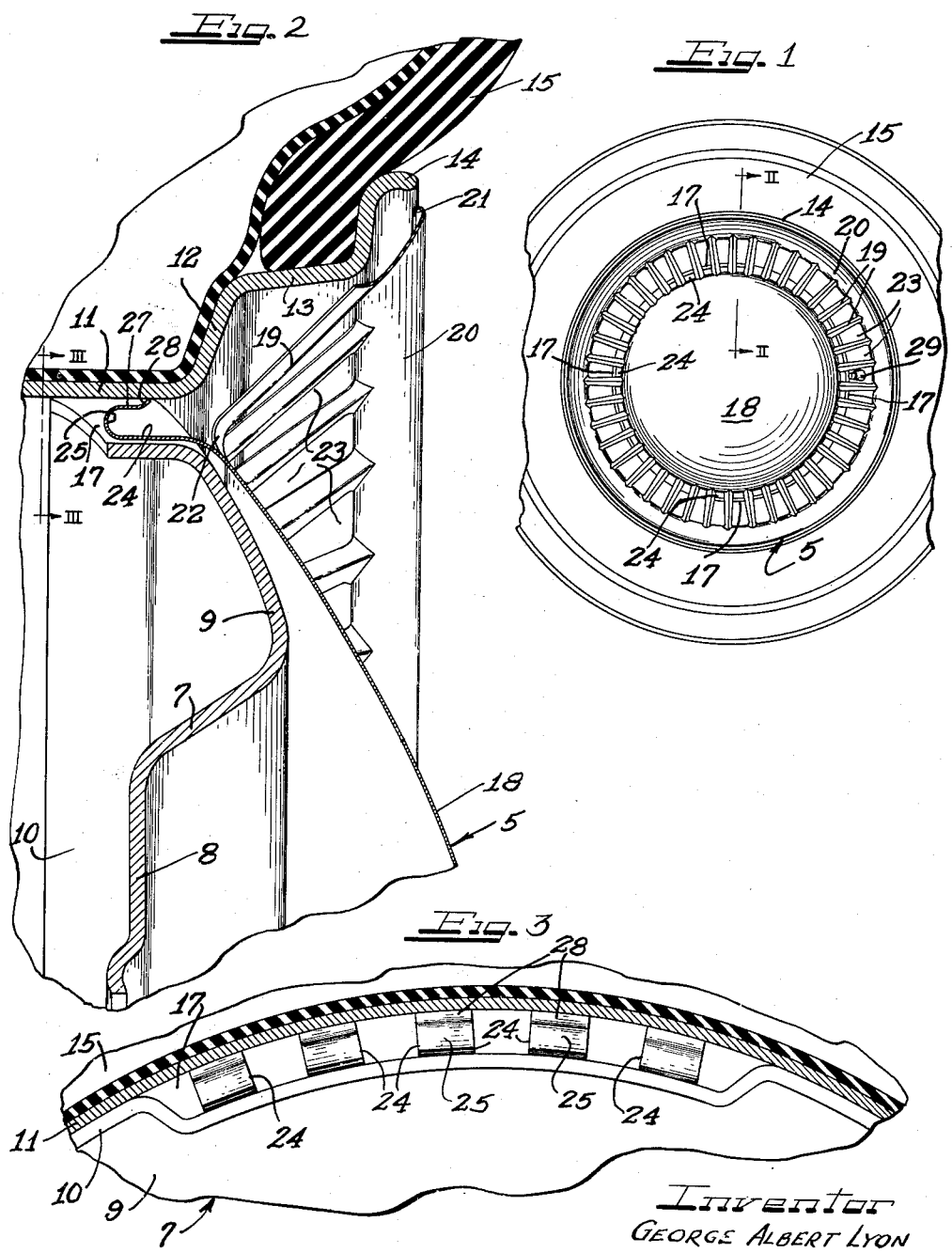

2,757,983

WHEEL COVER

George Albert Lyon, Detroit, Mich.

Application February 19, 1954, Serial No. 411,311

5 Claims. (Cl. 301—37)

The present invention relates to improvements in wheel structures and more particularly concerns the ornamental and protective covering of the outer sides of vehicle wheels.

An important object of the present invention is to provide an improved wheel structure having at the outer side thereof a novel wheel cover applied thereto in self-retaining relation.

Another object of the invention is to provide an improved air circulating wheel cover having openings therethrough adapted to cooperate with openings in a wheel for circulation of air through the wheel and cover.

A further object of the invention is to provide an improved one-piece sheet metal wheel cover.

Other objects, features and advantages of the present invention will be readily apparent from the following detailed description of a preferred embodiment thereof taken in conjunction with the accompanying drawing in which:

Figure 1 is a side elevational view of a wheel structure embodying features of the invention;

Figure 2 is a fragmentary enlarged radial sectional view taken substantially along the line II—II of Figure 1; and Figure 3 is a fragmentary sectional detail view taken substantially on the line III—III of Figure 2.

A cover 5 embodying features of the invention is adapted to be applied to the outer side of a vehicle wheel comprising a disk spider body 7 having a central dished bolt-on flange 8, an annular reinforcing intermediate nose bulge 9 and an outer marginal generally axially inwardly directed attachment flange 10. The flange 10 is adapted to be attached in suitable manner to a base flange 11 of a multi-flange, drop center rim having extending generally radially outwardly and axially outwardly sloping from the axially outer side of the base flange a side flange 12 which merges with a generally axially outwardly and radially outwardly sloping intermediate flange 13 joining a terminal flange 14. The tire rim supports a pneumatic tire and tube assembly 15. At spaced intervals the wheel body flange 10 is inset to provide air circulation openings 17.

According to the present invention the wheel cover 5 is constructed as a one-piece sheet metal stamping made from stainless steel or brass or the like which is adapted to take an attractive external finish such as a polished and buffed and plated finish or the like. The cover comprises a central circular crown portion 18 adapted to overlie the wheel body to adjacent the wheel openings 17. Extending divergently from the cover crown body portion 18 generally radially and axially outwardly is a uniform series of separate ribs 19 which at their radially outer ends join integrally in one-piece with an annular continuous outer marginal portion 20. The outer marginal portion extends to a diameter to overlie the terminal flange 14 and has an underturned outer edge reinforcing and finishing bead 21 which in assembly with the wheel lies adjacent to the tip of the terminal flange. Each of the ribs 19 is transversely arched and thereby substantially rigid and merges at its radially inner end on a substantially rigid juncture bend 22 with the adjacent margin of the body crown portion 18. Between the spokes 19 are provided substantial openings 23 through which air may circulate through the cover and through the wheel openings 17.

For retaining the cover on the wheel, material struck out from the cover plate in formation of the openings 23 between the rigid spokes 19 is utilized to provide axially inwardly directed cover retaining fingers 24. Each of the fingers 24 comprises an elongated leg portion that extends integrally in one piece from the edge of the crown portion 18 axially inwardly and has a return bent generally U-shaped loop leg portion 25 with a generally axially outwardly extending terminal leg portion 27 provided with a generally radially and axially outwardly turned short and stiff cover retaining terminal flange 28 adapted to engage in retaining relation edgewise against the inner face of the base flange 11 of the tire rim. The inside diameter described by the retaining finger legs 24 is slightly greater than the outside diameter described by the inset portions of the wheel body flange 10 so that in assembly the long legs 24 of the retaining fingers 24 will be flexibly movable inside the wheel openings 17. The radial dimension of the retaining finger loop portions 25 is such that the same can be received within the wheel openings 17 with room for flexible movement of the retaining fingers within the wheel openings to enable resilient tensioned engagement of the terminal flanges 28 with the base flange. Normally the retaining terminals 28 extend to a slightly greater diameter than the inside diameter of the base flange 11 so that when the cover is applied to the outer side of the wheel and pressed axially inwardly the retaining fingers 24 and more particularly the resilient leg portions 25 and 27 thereof are placed under resilient compression as the terminal flanges cam inwardly into retaining engagement with the base flange.

The retaining fingers 24 are disposed in clusters or groups as best seen in Figures 1 and 3, five such fingers for engaging in each cluster or group within one of the wheel openings 17 of which there may be, as shown, four. Thereby the cover is effectively retained on the wheel by the multiple retaining engagement effected by the groups of retaining fingers 24.

To apply the cover to the outer side of the wheel, the groups of retaining fingers 24 are generally registered with the outer sides of the wheel openings 17 and the cover is pressed axially inwardly to force the retaining fingers into the wheel openings and into effective retaining engagement at their terminals 28 against the base flange 11. To remove the cover from the wheel a pry-off tool may be inserted behind the outer marginal portion 20 of the cover and pry-off force applied axially outwardly to cause the retaining fingers to yield and the retaining terminals 28 to slide axially outwardly along the base flange 11 until the cover has been dislodged.

A valve stem 29 may be accommodated through one of the openings 23 in the spoked portion of the cover.

It will be understood that modifications and variations may be effected without departing from the scope of the novel concepts of the present invention.

I claim as my invention:

1. In a wheel structure including a tire rim and a wheel body with openings at the juncture of the wheel body with the tire rim, a wheel cover for disposition at the outer side of the wheel comprising a one-piece sheet metal crown body portion for overlying the wheel body to adjacent the wheel openings and having a series of generally radially and axially outwardly divergent spoke portions joining the crown body to an annular outer marginal portion for overlying the tire rim, the crown cover portion having at openings between the spokes a series of groups of generally axially inwardly directed retaining fingers engageable with the wheel in said wheel openings for retaining the cover on the wheel, the openings between the spokes and the wheel openings affording free circulation of air through the cover and the wheel, said retaining fingers comprising axially inwardly directed elongated leg portions and return bent U-shaped loop portions having generally radially outwardly directed short and stiff retaining terminals engageable retainingly with the base flange of the tire rim in said openings.

2. In a wheel structure including a tire rim and a supporting body member with openings through the wheel adjacent juncture of the rim and body member and defined by a generally radially facing flange, a wheel cover for disposition at the outer side of the wheel comprising a one-piece sheet metal crown body portion for overlying the wheel body member to adjacent the wheel openings and having a series of generally radially and axially outwardly divergent spoke portions joining the crown body portion to an annular outer marginal portion for overlying the tire rim, the crown cover portion having adjacent the inner ends of the spoke portions cover retaining fingers provided with generally axially inwardly directed elongated legs with axially outwardly return bent flexible terminal legs provided with short and stiff generally radially extending extremities for retaining engagement at their tips with said wheel opening flanges, whereby the cover is retained in press-on, pry-off relation by the fingers, there being a plurality of said fingers extending in cover retaining relation into each of said openings into which the fingers extend.

3. In a wheel structure including a tire rim and a supporting body member with openings through the wheel adjacent juncture of the rim and body member and defined by a generally radially facing flange, a wheel cover for disposition at the outer side of the wheel comprising a one-piece sheet metal crown body portion for overlying the wheel body member to adjacent the wheel openings and having a series of generally radially and axially outwardly divergent spoke portions joining the crown body portion to an annular outer marginal portion for overlying the tire rim, the crown cover portion having adjacent the inner ends of the spoke portions cover retaining fingers provided with generally axially inwardly directed elongated legs with axially outwardly return bent flexible terminal legs provided with short and stiff generally radially extending extremities for retaining engagement at their tips with said wheel opening flanges, whereby the cover is retained in press-on, pry-off relation by the fingers, there being a plurality of said fingers extending in cover retaining relation into each of said openings into which the fingers extend, said fingers being derived from material struck from between said spokes.

4. In a wheel structure including a tire rim and a wheel body with openings adjacent juncture of the wheel body and the tire rim, a wheel cover for disposition at the outer side of the wheel comprising a one-piece sheet metal crown body portion for overlying the wheel body to adjacent the wheel openings and having a series of generally radially and axially outwardly divergent spoke portions joining the crown body to an annular outer marginal portion for overlying the tire rim, the cover having adjacent juncture of the spoke and crown cover portions a series of groups of generally axially inwardly directed retaining fingers arranged to extend into said wheel openings, the openings between the spokes and the wheel openings affording substantial air circulation passageway through the cover and the wheel, said retaining fingers comprising generally axially inwardly directed elongated leg portions and return bent U-shaped loop portions affording generally axially outwardly extending respective radially resiliently flexible legs having generally radially directed angular short and stiff retaining terminals projecting generally away from said axially inwardly directed leg portions and engageable retainingly with a generally radially opposingly facing flange portion at each of the respective openings, whereby the groups of fingers in the respective openings retain the cover in press-on, pry-off relation on the wheel.

5. In a wheel structure as defined in claim 4, the spoke portions having substantially rigid junctures with the respective crown body portion and the annular outer marginal portion so as to effectively resist press-on and pry-off pressures applied to the crown or outer marginal portion.

References Cited in the file of this patent
UNITED STATES PATENTS

| | | |
|---|---|---|
| Re. 19,467 | Lyon | Feb. 12, 1935 |
| D. 167,271 | McLeod | July 15, 1951 |
| 2,231,931 | Lyon | Feb. 18, 1941 |
| 2,386,236 | Lyon | Oct. 9, 1945 |